United States Patent Office 2,986,056
Patented May 30, 1961

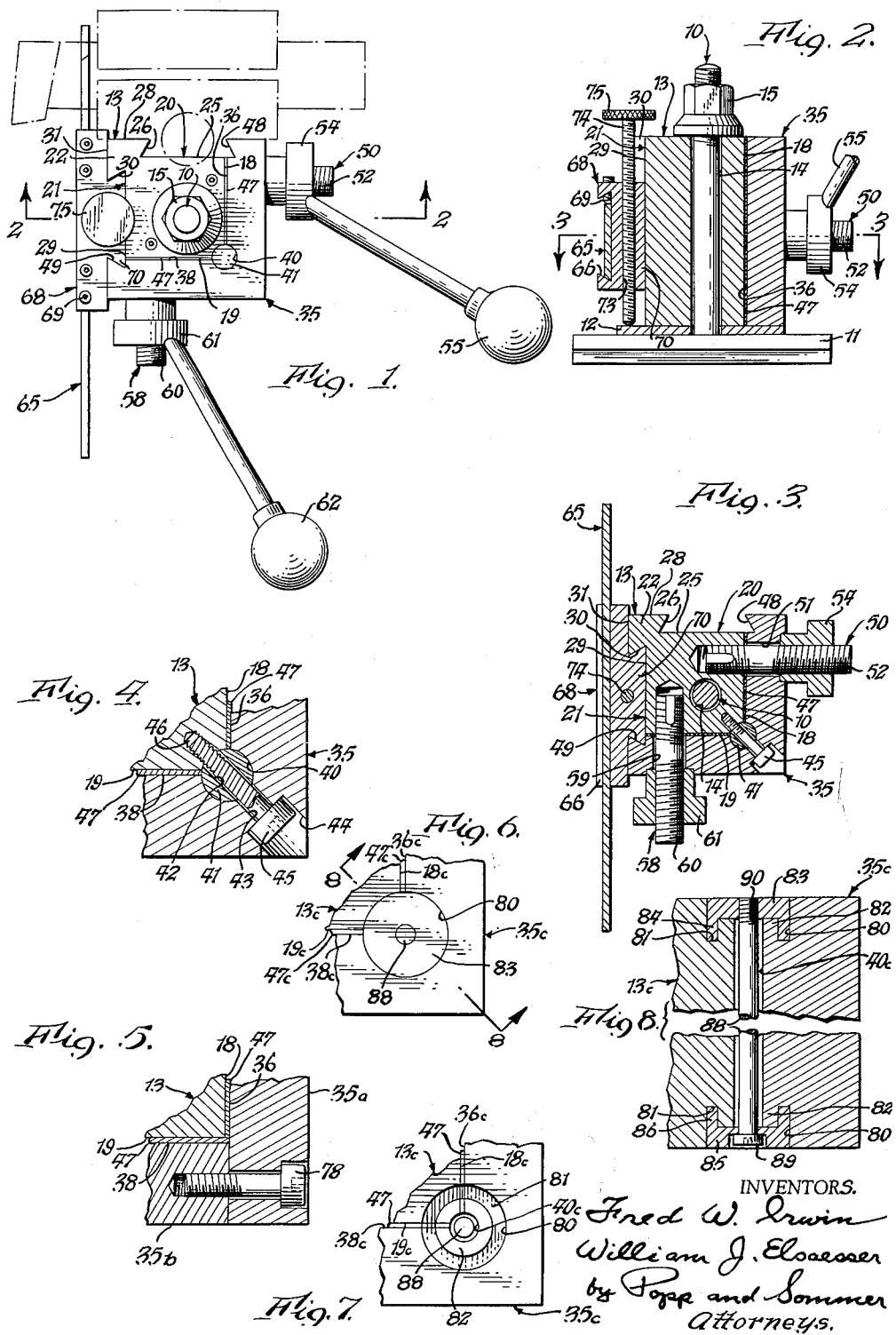

2,986,056
TOOL HOLDER
Fred W. Irwin, 45 Plymouth St., Buffalo, N.Y., and William J. Elsaesser, 72 Kane St., Buffalo, N.Y.
Filed Feb. 5, 1959, Ser. No. 791,390
6 Claims. (Cl. 82—36)

This invention relates to a device for holding tools in desired relation to a workpiece being formed upon a lathe or the like.

The principal object of the invention is to provide such a tool holder in which the tool is powerfully and precisely held to an exact setting.

Another object is to provide such a tool holder which is adapted to quick interchange and setting up of the tool and in which, by suitably indexing, a removed tool can be brought back to exactly the same position with reference to the workpiece.

Another object is to provide such a tool holder which is suitable for all lathe operations and can be used with any kind of tools.

Another important object of the invention is to provide such a tool holder which is composed of very few low cost parts which are easily machined to a high degree of accuracy.

Another aim is to provide a positive corner abutment for the tool carrying part of the tool holder and which corner abutment provides a positive and rigid support maintaining an accurate setting under heavy load conditions without change or chatter.

Another object is to provide such a tool holder in which the tool can be adjusted without the use of shims or the like.

Another object of the invention is to provide such a tool holder which is applicable to all lathe operations including boring, turning, facing, drilling and tapping.

Another object is to provide such a tool holder which can be used with different size lathes.

Another object of the invention is to provide such a tool holder which can be made from standard, low cost parts.

Other objects and advantages of the invention will be explained in the following description and drawings in which:

Fig. 1 is a top plan view of one form of tool holder embodying the present invention.

Fig. 2 is a vertical section taken generally on line 2—2, Fig. 1.

Fig. 3 is a horizontal section taken generally on line 3—3, Fig. 2.

Fig. 4 is an enlarged fragmentary section similar to Fig. 3.

Fig. 5 is a fragmentary view similar to Fig. 3 and showing a modified form of the invention.

Fig. 6 is an enlarged fragmentary plan view similar to Fig. 1 but illustrating a further modified form of the invention.

Fig. 7 is a view similar to Fig. 6 with a part removed.

Fig. 8 is a fragmentary vertical section taken generally on line 8—8, Fig. 6.

The tool holder of the present invention is adapted to be secured to the compound rest of a lathe (not shown) by means of a key bolt 10 the base part 11 of which can be secured to the compound rest on the carriage of the lathe in any suitable manner. This key bolt 10 extends through the bottom plate 12 for a post in the form of a metal block 13, this metal block being provided with a central vertical bore 14 through which the key bolt extends and projects from the top of the post. The key bolt is provided with a nut 15 for securely clamping the post 13 down on the compound rest of the lathe.

The post 13 has two adjacent vertical side faces 18, 19, which are arranged at right angles to each other and are in the form of simple vertical, rectangular, planar or flat surfaces. The other two vertical faces of the post, indicated generally at 20, 21, are of Z-shaped form in horizontal section to provide jointly a vertical corner protuberance 22, which is of arrow-head shape in horizontal section. Thus, the face 20 is formed to provide a major vertical planar or flat face 25, which is arranged at right angles to and meets the face 18. The opposite end of this face 25 terminates in an angular shoulder 26, which is arranged at an acute angle thereto. The opposite end of this acute angular face terminates in a vertical planar or flat face 28, which is parallel to the face 25. Similarly, the face 21 is formed to provide a major vertical planar or flat face 29 which is arranged at right angles to and meets the face 19. The opposite end of this face 29 terminates in an angular shoulder 30, which is arranged at an acute angle thereto. The opposite end of this acute angular face terminates in a vertical planar or flat face 31, which is parallel to the face 29.

The post 13 is of uniform shape in horizontal section through its height.

A clamping plate 35, which is L-shaped in horizontal section, is adapted to be clamped against either of the faces 18 or 19 of the post 13. For this purpose, this clamping plate is shown as having two vertical planar or flat inner faces 36 and 38 arranged at right angles to each other and opposing the corresponding faces 18, 19 of the post. These faces 36, 38, as well as the faces 18, 19 jointly terminate in a vertical cylindrical bore 40 which extends the full height of the post 13 at the corner opposite the arrow-head shaped protuberance 22 and also extends the full height of the L-shaped plate 35. In this bore 40 is loosely fitted a vertical pin 41 which rests upon the base plate 12 along with the L-shaped clamping plate 35. This pin is provided with a horizontal through bore 42 which is arranged to register with a bore 43 and counter-bore 44 through the corner of the L-shaped plate 35. A screw 45 has its shank and head arranged respectively in the bores 42, 43 and counter-bore 44 and is anchored in a threaded bore 46 in the post 13. It will be seen that this screw holds the clamping plate to the post and that the pin 41 forms a corner pivot for the L-shaped clamping plate 35 in guiding either of the faces 36 or 38 into clamping relation with the corresponding faces 18 or 19. Preferably sheets 47 of neoprene or other soft, resilient, flexible material is interposed between each pair of these clamping faces.

The opposite ends of the L-shaped clamping plate 35 project beyond the faces 25, 29 of the post 13 and these projecting ends are provided with V-shaped grooves 48, 49 which are complementary to the corresponding grooves 25, 26 and 29, 30 provided in the post 13. The faces 25, 26 and 46, as well as the faces 29, 30 and 49 jointly provide dovetail-shaped grooves extending the full height of the post 13 and clamping plate 35 on two sides of the post.

As previously indicated, either face 36 or 38 of the clamping plate 35 can be brought into clamping engagement with the neoprene plate 47 on the corresponding face 18 or 19 of the post 13. For this purpose, a horizontal stud screw 50 is anchored in the post 13 to project outwardly from the face 18 near the face 20 thereof and through the corresponding neoprene plate 47 and through a bore 51 provided in the L-shaped clamping 35. The outwardly projecting end of this stud bolt is threaded, as indicated at 52, to receive the threaded hub 54 of a clamping screw provided with a handle 55. Similarly, a stud bolt 58 is anchored in the post 13 to extend outwardly from the face 19 adjacent the face 29 thereof and through the corresponding neoprene plate 47 and through a bore 59 provided in the clamping plate 35. The projecting end of this screw is threaded, as indicated at 60, to receive the threaded hub 61 of a clamping screw having handle 62.

The tool is indicated at 65 and can be of any usual and well known form. This tool is adapted to be secured in a horizontal dovetail groove 66 of a tool carrier indicated generally at 68. The tool can be secured in the bottom of the dovetail groove 66 in any suitable manner as by the provision of the set screws 69 shown.

The side of the tool carrier opposite the horizontal dovetail groove 66 is machined to provide a vertical boss or projection 70 which is of dovetail form in horizontal section and adaped to fit either the groove 29, 30, 49, as shown in full lines in Figs. 1, 2, and 3 or to fit the dovetail groove 25, 26, 48, as shown by dot-dash lines in Fig. 1. The carrier 68 is shown as having a vertical threaded bore 73 through the center of the dovetail projection 70 and receiving a screw 74, which is provided at its upper end with a knurled fixed head 75. The lower end of the screw is rounded and bears against the bottom plate 12 and it will be seen that by means of this screw, the tool carrier 68 can be adjusted to any vertical position along its supporting dovetail groove with a high degree of precision.

As an economy in manufacture, the post 13 and L-shaped clamping plate 35 are preferably made from the same rectangular block of metal. For the production of the tool holder as shown, this block of metal would be square in horizontal section and the first operation is to machine the grooves 25, 26, and 48, and 29, 30 and 49 into adjacent sides thereof. Following this, the vertical bore 40 is provided in the opposite corner of the block. Following this, a saw cut is made to provide the faces 18 and 36 of the post 13 and L-shaped clamping plate 35, respectively, this saw cut going through to the bore 40. Following this, a vertical saw cut is made to provide the faces 19 and 38 of the post 13 and L-shaped plate 35, respectively, this saw cut going through to the vertical bore 40. It will be seen that by so making the tool holder, a very economical method has been effected in machining the various parts and in insuring their proper co-operation with one another.

In lieu of such a method of machining the tool holder, it is apparent that the L-shaped clamping plate could be made of two separate plates 35a and 35b kept together by screws 78 or in any other suitable manner, such a modification being illustrated in Fig. 5.

In use, the base 11 of the key bolt 10 is adjusted along the compound rest of the lathe (not shown) to the proper location and fixed into position. The nut 15 is then tightened so as to clamp the post 13 and base 12 securely against the compound rest of the lathe, the post first having been oriented in the proper position around anchoring key bolt 10. The tool 65 is then placed in the horizontal dovetail groove of the tool carrier 68 and secured therein by tightening the set screws 69. The dovetail projection 70 of this carrier is then slid down vertically in one or the other of the dovetail grooves 29, 30, 49 as shown by full lines, or in the dovetail groove 25, 26 and 48 as shown by the dot-dash lines in Fig. 1. The adjusting screw 74 is then turned by means of its knurled head 75 so as to adjust the tool carrier 68 to the exact elevation required by its tool 65.

If the tool carrier 68 has been placed in the dovetail groove 29, 30, 49 as shown by full lines in Figs. 1, 2 and 3, the clamping screw 58 would be used. This clamping screw would be turned, by means of the handle 62, to work along the threads 60 of this clamping screw and draw the face 38 of the L-shaped clamping plate 35 into compressive relation with the neoprene plate 47 and the face 19 of the block. In doing so, the clamping plate groove face 49 is moved into clamping relation with the face 30 of the dovetail protuberance 70 and forces this protuberance toward the clamping face 30 of the post 13. This positively and reliably anchors the tool carrier 68 against the corner of the post and positively prevents movement of the carrier in any direction. Accordingly, the tool 65 is reliably held in position without danger of chattering.

In tightening either clamping nut 54 or 61, the L-shaped clamping plate fulcrums about the pin 41 which serves as a pivot in insuring clamping of the tool to an exact location and thereby imparts a greater degree of precision and ease in setting up the tool holder.

It will be noted that if a change in tools is required, but that the operator desires to come back to the tool 65 at the same setting, all he need do is to remove the carrier 68 and proceed with his other operations with other tools. Following this, when the carrier 68 is replaced, the adjusting screw 74 will index it to exactly the same position so that no resetting is required.

The form of the invention illustrated in Figs. 6-8 was designed to overcome certain manufacturing difficulties encountered with the form of the invention shown in Figs. 1-4. More particular difficulty was found in providing alining horizontal bores 42, 43, 44 and 46 for the screw 45 as illustrated in Fig. 4. To secure the L-shaped clamping plate, designated at 35c in Figs. 6 through 8, to the post 13c, these parts are jointly provided with the bore 40c, similar to the bore 40 in the form of the invention formed in Figs. 1-4. However, at both the upper and lower ends of this bore 40c a counterbore 80 is provided, these counterbores having axial extensions or annular channels 81 at their periphery which extend in opposed relation to each other to provide a circular pivot extension or hub 82 at the upper and at the lower end of the bore.

A conforming annular cap 83 is fitted in the upper counterbore 80, this cap having an annular axially extending flange 84 journalled on the pivot extension or hub 82. Similarly, an annular cap 85 is fitted in the lower counterbore 80, this cap also having an axially extending flange 86 journalled on the lower pivot extension or hub 82. A screw 88 connects the caps 83 and 85, this screw having a head 89 seated in one of these caps and having its opposite end 90 threaded and screwed into the other of the caps.

In other respects the form of the invention shown in Figs. 6-8 is identical with the form of the invention shown in Figs. 1-4 and hence the same reference numerals have been employed and distinguished by the suffixes "c."

Since the operation of the form of the invention shown in Figs. 6-8 is identical to that shown in Figs. 1-4 a description of the operation is not repeated.

It will be seen that all forms of the present tool holder have, referring to the form of the invention shown in Figs. 1-4, the post 13 adapted to be mounted on the compound rest of a lathe and having four major flat vertical sides 25, 18, 19 and 29 arranged in perpendicular relation to each other to render the post generally rectangular in horizontal section; the vertical arrow-head shaped projection 22 along one corner of the post and providing with the two adjacent major faces 25 and 29 a pair of vertical undercut grooves 26 and 30; the clamping plate 35 of L-shaped form in horizontal section having flat vertical faces 36, 38 arranged in perpendicular relation to each other and adapted to fit against the two other major faces 18, 19 of said post, this clamping plate having its opposite ends protruding beyond the two sides adjacent major faces 25, 29 and each provide the vertical grooves 46, 48 forming with the under cut grooves 26, 30 a pair of vertical dovetail grooves, each adapted to receive the dovetail projection 70 of the tool carrier 68; and means, such as the clamping nuts 54, 61 and stud bolts 50, 58, to clamp either of the grooved ends of the L-shaped clamping plate 35 against one of these two other major faces 18, 19 to force the dovetail projection of the tool carrier into the corresponding undercut groove 26, 30.

We claim:

1. A toll holder of the character described, comprising a post adapted to be mounted on the bed of a lathe and having four major flat vertical sides arranged in perpendicular relation to each other to provide a post which is generally rectangular in horizontal section, a vertical projection extending along one corner of said post and forming with one of said major faces a vertical undercut groove, the opposite corner of said post being formed to provide a vertical fulcrum seat, fulcrum means including a fulcrum member seated on said fulcrum seat, a separate clamping plate of L-shaped form in horizontal section seated at its inside corner on said fulcrum member and having inner flat vertical faces arranged in perpendicular relation to each other and adapted to fit close to two of said major faces other than said one of said major faces, said clamping plate having a part protruding beyond said one of said faces provided with a vertical groove forming with said undercut groove and said one of said major faces a vertical dovetail groove adapted to receive a dovetail projection of a tool carrier, and means anchored in said post to clamp the grooved part of said L-shaped clamping plate against the corresponding major face of said post to force the dovetail projection of said tool carrier into said undercut grooves.

2. A tool holder as set forth in claim 1 wherein said fulcrum means are housed in a vertical bore extending in part through the vertical corner of said post opposite said projection providing an undercut groove and in part through the inside corner of said L-shaped clamping plate.

3. A tool holder as set forth in claim 2 wherein said fulcrum means include a rod fitted in said bore.

4. A tool holder as set forth in claim 1 wherein said L-shaped clamping plate is composed of two separate generally rectangular plates fastened together along corresponding vertical ends thereof.

5. A tool holder as set forth in claim 3 wherein the faces of said post and L-shaped clamping plate at at least one end of said rod are jointly provided with an annular groove concentric with said rod, and wherein said fulcrum means also include a cap is secured to said one end of said rod and has an annular axially extending flange fitting in said annular groove and holding said clamping plate in operative relation to said post.

6. A tool holder as set forth in claim 3 wherein the faces of said post and L-shaped clamping plate at each end of said rod are jointly provided with an annular groove concentric with said rod, and wherein said fulcrum means also include a cap is secured to each end of said rod and each of which caps has an axially extending annular flange fitting in a corresponding one of said annular grooves and holding said clamping plate in operative relation to said post.

References Cited in the file of this patent

UNITED STATES PATENTS 2,684,608    Roman    July 27, 1954

FOREIGN PATENTS 490,995    Italy    Feb. 22, 1954